United States Patent
Isenhour et al.

(10) Patent No.: US 9,004,778 B2
(45) Date of Patent: Apr. 14, 2015

(54) INDEXABLE OPTICAL FIBER CONNECTORS AND OPTICAL FIBER CONNECTOR ARRAYS

(75) Inventors: Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 198 days.

(21) Appl. No.: 13/537,753

(22) Filed: Jun. 29, 2012

(65) Prior Publication Data

US 2014/0003771 A1    Jan. 2, 2014

(51) Int. Cl.
  G02B 6/36    (2006.01)
  G02B 6/38    (2006.01)

(52) U.S. Cl.
  CPC ............ *G02B 6/3831* (2013.01); *G02B 6/3897* (2013.01)

(58) Field of Classification Search
  None
  See application file for complete search history.

(56) References Cited

U.S. PATENT DOCUMENTS

| | | | |
|---|---|---|---|
| 1,280,393 A | 10/1918 | Cannon | |
| 1,703,255 A | 2/1929 | Wagner | |
| 2,003,147 A | 5/1935 | Holm-Hansen | |
| 2,044,073 A | 6/1936 | Hurley | |
| 2,131,408 A | 9/1938 | Murrer | |
| 2,428,149 A | 9/1947 | Falk | |
| 2,681,201 A | 6/1954 | Grunwald | |
| 2,984,488 A | 5/1961 | Kirchner | |
| 3,054,994 A | 9/1962 | Haram | |
| 3,204,867 A | 9/1965 | Wahlbom | |
| 3,435,124 A | 3/1969 | Channell | |
| 3,880,390 A | 4/1975 | Niven | |
| 4,006,540 A | 2/1977 | Lemelson | |
| 4,012,010 A | 3/1977 | Friedman | |
| 4,073,560 A | 2/1978 | Anhalt et al. | |

(Continued)

FOREIGN PATENT DOCUMENTS

| DE | 4130706 A1 | 3/1993 |
|---|---|---|
| DE | 4133375 C1 | 4/1993 |

(Continued)

OTHER PUBLICATIONS

Notice of Allowance for U.S. Appl. No. 11/595,723 mailed Dec. 28, 2010, 8 pages.

(Continued)

*Primary Examiner* — Sung Pak (57) ABSTRACT

Indexable optical fiber connectors, optical connector arrays, and optical connector systems are disclosed. According to one embodiment, an optical fiber connector includes a connector body comprising an optical coupling face and a connector housing that surrounds the connector body. The connector housing includes a first interconnecting surface having an indentation arraying feature, and a second interconnecting surface having a protrusion arraying feature. The first interconnecting surface and the second interconnecting surface are orthogonal to the optical coupling face. The indentation arraying feature is configured to mate with a corresponding protrusion arraying feature of a first adjacent interconnecting optical fiber connector by a non-locking engagement relationship. Similarly, the protrusion arraying feature is configured to mate with a corresponding indentation arraying feature of a second adjacent optical fiber connector by a non-locking engagement relationship.

25 Claims, 6 Drawing Sheets

(56) References Cited

U.S. PATENT DOCUMENTS

| | | |
|---|---|---|
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |
| 4,244,544 A | 1/1981 | Kornat |
| 4,261,529 A | 4/1981 | Sandberg et al. |
| 4,261,644 A | 4/1981 | Giannaris |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,579,310 A | 4/1986 | Wells et al. |
| 4,586,675 A | 5/1986 | Brown |
| 4,595,255 A | 6/1986 | Bhatt et al. |
| 4,611,887 A | 9/1986 | Glover et al. |
| 4,697,873 A | 10/1987 | Bouvard et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,812,004 A | 3/1989 | Biederstedt et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,007,701 A | 4/1991 | Roberts |
| 5,023,646 A | 6/1991 | Ishida et al. |
| 5,048,916 A | 9/1991 | Caron |
| 5,048,926 A | 9/1991 | Tanimoto |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,121,458 A | 6/1992 | Nilsson et al. |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | Machall et al. |
| 5,209,441 A | 5/1993 | Satoh |
| 5,210,374 A | 5/1993 | Channell |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,261,020 A | 11/1993 | de Jong et al. |
| 5,265,187 A | 11/1993 | Morin et al. |
| 5,271,585 A | 12/1993 | Zetena, Jr. |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,473,115 A | 12/1995 | Brownlie et al. |
| 5,479,553 A | 12/1995 | Daems et al. |
| 5,479,554 A | 12/1995 | Roberts |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,579,425 A * | 11/1996 | Lampert et al. ............... 385/59 |
| 5,590,234 A | 12/1996 | Pulido |
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,706,384 A | 1/1998 | Peacock et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,737,475 A | 4/1998 | Regester |
| 5,751,882 A | 5/1998 | Daems et al. |
| 5,758,004 A | 5/1998 | Alarcon et al. |
| 5,764,843 A | 6/1998 | Macken et al. |
| 5,774,612 A | 6/1998 | Belenkiy et al. |
| 5,775,648 A | 7/1998 | Metzger |
| 5,778,132 A | 7/1998 | Csipkes et al. |
| 5,781,678 A | 7/1998 | Sano et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,870,519 A | 2/1999 | Jenkins et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,946,440 A | 8/1999 | Puetz |
| 5,956,439 A | 9/1999 | Pimpinella |
| 5,956,444 A | 9/1999 | Duda et al. |
| 5,969,294 A | 10/1999 | Eberle et al. |

(56) References Cited

U.S. PATENT DOCUMENTS

| | | |
|---|---|---|
| 5,975,769 A | 11/1999 | Larson et al. |
| 5,978,540 A | 11/1999 | Bechamps et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |
| 6,079,881 A | 6/2000 | Roth |
| D427,897 S | 7/2000 | Johnston et al. |
| 6,118,075 A | 9/2000 | Baker et al. |
| 6,129,221 A | 10/2000 | Shaha |
| 6,149,315 A | 11/2000 | Stephenson |
| 6,151,436 A | 11/2000 | Burek et al. |
| 6,160,946 A | 12/2000 | Thompson et al. |
| D436,027 S | 1/2001 | Johnston et al. |
| 6,175,079 B1 | 1/2001 | Johnston et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,245,998 B1 | 6/2001 | Curry et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | BuAbbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,304,707 B1 | 10/2001 | Daems et al. |
| 6,307,997 B1 | 10/2001 | Walters et al. |
| 6,307,998 B2 | 10/2001 | Williams Vigliaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,351,592 B1 | 2/2002 | Ehn et al. |
| 6,353,696 B1 | 3/2002 | Gordon et al. |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| 6,439,780 B1 | 8/2002 | Mudd et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,522,814 B2 | 2/2003 | Yoshida et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,571,047 B1 | 5/2003 | Yarkosky et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B2 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,674,952 B2 | 1/2004 | Howell et al. |
| 6,710,366 B1 | 3/2004 | Lee et al. |
| 6,711,339 B2 | 3/2004 | Puetz et al. |
| 6,715,619 B2 | 4/2004 | Kim et al. |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,804,447 B2 | 10/2004 | Smith et al. |
| 6,809,258 B1 | 10/2004 | Dang et al. |
| D498,005 S | 11/2004 | Winig et al. |
| 6,816,661 B1 | 11/2004 | Barnes et al. |
| 6,819,856 B2 | 11/2004 | Dagley et al. |
| 6,819,857 B2 | 11/2004 | Douglas et al. |
| 6,845,207 B2 | 1/2005 | Schray et al. |
| 6,850,685 B2 | 2/2005 | Tinucci et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,915,058 B2 | 7/2005 | Pons |
| 6,915,059 B2 | 7/2005 | Daoud et al. |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,932,514 B2 * | 8/2005 | Anderson et al. ............... 385/59 |

(56) References Cited

U.S. PATENT DOCUMENTS

| | | |
|---|---|---|
| 6,934,451 B2 | 8/2005 | Cooke et al. |
| 6,937,807 B2 | 8/2005 | Franklin et al. |
| 6,946,605 B2 | 9/2005 | Levesque et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,006,748 B2 | 2/2006 | Dagley et al. |
| 7,027,695 B2 | 4/2006 | Cooke et al. |
| 7,054,513 B2 | 5/2006 | Herz et al. |
| 7,068,907 B2 | 6/2006 | Schray |
| 7,083,051 B2 | 8/2006 | Smith et al. |
| 7,088,891 B2 | 8/2006 | Jung et al. |
| 7,110,654 B2 | 9/2006 | Dillat |
| 7,120,347 B2 | 10/2006 | Blackwell, Jr. et al. |
| 7,128,470 B2 * | 10/2006 | Scherer et al. ......... 385/59 |
| 7,130,519 B2 | 10/2006 | Grubish et al. |
| 7,142,763 B2 | 11/2006 | Frohlich et al. |
| 7,142,764 B2 | 11/2006 | Allen et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,201,595 B1 | 4/2007 | Morello |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,331,722 B2 | 2/2008 | Tan |
| 7,349,616 B1 | 3/2008 | Castonguay et al. |
| 7,369,741 B2 * | 5/2008 | Reagan et al. ......... 385/139 |
| 7,376,325 B1 | 5/2008 | Cloud et al. |
| 7,379,650 B2 | 5/2008 | Weinert et al. |
| 7,406,241 B1 | 7/2008 | Opaluch et al. |
| 7,412,145 B2 | 8/2008 | Honma et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,496,269 B1 | 2/2009 | Lee |
| 7,509,016 B2 | 3/2009 | Smith et al. |
| 7,522,805 B2 | 4/2009 | Smith et al. |
| 7,526,174 B2 | 4/2009 | Leon et al. |
| 7,609,967 B2 | 10/2009 | Hochbaum et al. |
| 7,613,376 B2 | 11/2009 | Wright et al. |
| 7,623,749 B2 | 11/2009 | Reagan et al. |
| 7,636,507 B2 | 12/2009 | Lu et al. |
| 7,664,361 B2 | 2/2010 | Trebesch et al. |
| 7,690,848 B2 * | 4/2010 | Faika et al. ......... 385/59 |
| 7,766,732 B2 | 8/2010 | Hauville |
| 7,769,265 B2 | 8/2010 | Cairns |
| 7,822,310 B2 | 10/2010 | Castonguay et al. |
| 7,844,161 B2 | 11/2010 | Reagan et al. ......... 385/135 |
| 7,889,961 B2 | 2/2011 | Cote et al. |
| 7,970,249 B2 | 6/2011 | Solheid et al. |
| 7,974,509 B2 | 7/2011 | Smith et al. |
| 8,086,085 B2 | 12/2011 | Lu et al. |
| 8,265,447 B2 | 9/2012 | Loeffelholz et al. |
| 8,351,754 B2 | 1/2013 | Bell |
| 8,380,036 B2 * | 2/2013 | Smith ......... 385/136 |
| 8,437,595 B2 | 5/2013 | Womack et al. |
| 8,465,317 B2 * | 6/2013 | Gniadek et al. ......... 439/344 |
| 8,467,651 B2 | 6/2013 | Cao et al. |
| 8,712,206 B2 | 4/2014 | Cooke et al. |
| 2001/0001270 A1 | 5/2001 | Williams Vigliaturo |
| 2001/0036351 A1 | 11/2001 | Fritz |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0180163 A1 | 12/2002 | Muller et al. |
| 2002/0181896 A1 | 12/2002 | McClellan et al. |
| 2002/0181905 A1 | 12/2002 | Yoshida et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0194187 A1 | 10/2003 | Simmons et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0109660 A1 | 6/2004 | Liberty |
| 2004/0123998 A1 | 7/2004 | Berglund et al. |
| 2004/0141692 A1 * | 7/2004 | Anderson et al. ......... 385/53 |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0036749 A1 | 2/2005 | Vogel et al. |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0135753 A1 * | 6/2005 | Eigenmann et al. ......... 385/59 |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0127087 A1 | 6/2006 | Kasai et al. |
| 2006/0133753 A1 | 6/2006 | Nelson et al. |
| 2006/0153515 A1 | 7/2006 | Honma et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210229 A1 | 9/2006 | Scadden |
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |

(56) References Cited

U.S. PATENT DOCUMENTS

| | | | |
|---|---|---|---|
| 2006/0269206 A1 | 11/2006 | Zimmel | |
| 2006/0269208 A1 | 11/2006 | Allen et al. | |
| 2006/0275007 A1 | 12/2006 | Livingston et al. | |
| 2006/0275008 A1 | 12/2006 | Xin | |
| 2006/0279423 A1 | 12/2006 | Nazari | |
| 2006/0285807 A1 | 12/2006 | Lu et al. | |
| 2007/0003204 A1 | 1/2007 | Makrides-Saravanos et al. | |
| 2007/0003205 A1 | 1/2007 | Saravanos et al. | |
| 2007/0023464 A1 | 2/2007 | Barkdoll et al. | |
| 2007/0031099 A1 | 2/2007 | Herzog et al. | |
| 2007/0031101 A1 | 2/2007 | Kline et al. | |
| 2007/0047891 A1 | 3/2007 | Bayazit et al. | |
| 2007/0047893 A1 | 3/2007 | Kramer et al. | |
| 2007/0047894 A1 | 3/2007 | Holmberg et al. | |
| 2007/0052531 A1 | 3/2007 | Mathews et al. | |
| 2007/0104447 A1 | 5/2007 | Allen | |
| 2007/0114339 A1 | 5/2007 | Winchester | |
| 2007/0183732 A1 | 8/2007 | Wittmeier et al. | |
| 2007/0263962 A1 | 11/2007 | Kohda | |
| 2007/0274718 A1 | 11/2007 | Bridges et al. | |
| 2008/0008437 A1* | 1/2008 | Reagan et al. | 385/135 |
| 2008/0063350 A1 | 3/2008 | Trebesch et al. | |
| 2008/0085094 A1 | 4/2008 | Krampotich | |
| 2008/0131067 A1 | 6/2008 | Ugolini et al. | |
| 2008/0138026 A1 | 6/2008 | Yow et al. | |
| 2008/0145008 A1 | 6/2008 | Lewallen et al. | |
| 2008/0193091 A1 | 8/2008 | Herbst | |
| 2008/0205844 A1 | 8/2008 | Castonguay et al. | |
| 2008/0253723 A1 | 10/2008 | Stokes et al. | |
| 2008/0259928 A1 | 10/2008 | Chen et al. | |
| 2008/0292261 A1 | 11/2008 | Kowalczyk et al. | |
| 2008/0317425 A1* | 12/2008 | Smith et al. | 385/135 |
| 2009/0022470 A1 | 1/2009 | Krampotich | |
| 2009/0034929 A1 | 2/2009 | Reinhardt et al. | |
| 2009/0060440 A1 | 3/2009 | Wright et al. | |
| 2009/0074371 A1 | 3/2009 | Bayazit et al. | |
| 2009/0097813 A1 | 4/2009 | Hill | |
| 2009/0103865 A1 | 4/2009 | Del Rosso | |
| 2009/0103878 A1 | 4/2009 | Zimmel | |
| 2009/0148118 A1 | 6/2009 | Gronvall et al. | |
| 2009/0208210 A1 | 8/2009 | Trojer et al. | |
| 2009/0245746 A1 | 10/2009 | Krampotich et al. | |
| 2009/0252462 A1 | 10/2009 | Bonical | |
| 2009/0263122 A1 | 10/2009 | Helkey et al. | |
| 2009/0274429 A1 | 11/2009 | Krampotich et al. | |
| 2009/0297111 A1 | 12/2009 | Reagan et al. | |
| 2009/0304342 A1 | 12/2009 | Adomeit et al. | |
| 2009/0324189 A1 | 12/2009 | Hill et al. | |
| 2010/0061693 A1 | 3/2010 | Bran de Leon et al. | |
| 2010/0183274 A1 | 7/2010 | Brunet et al. | |
| 2010/0290753 A1 | 11/2010 | Tang et al. | |
| 2011/0052133 A1 | 3/2011 | Simmons et al. | |
| 2011/0097052 A1 | 4/2011 | Solheid et al. | |
| 2011/0158599 A1 | 6/2011 | Kowalczyk et al. | |
| 2012/0104145 A1 | 5/2012 | Dagley et al. | |
| 2012/0301096 A1 | 11/2012 | Badar et al. | |
| 2012/0308190 A1 | 12/2012 | Smith et al. | |
| 2013/0034333 A1 | 2/2013 | Holmberg et al. | |
| 2014/0119705 A1 | 5/2014 | Fabrykowski et al. | |

FOREIGN PATENT DOCUMENTS

| | | |
|---|---|---|
| DE | 4240727 C1 | 2/1994 |
| DE | 29800194 U1 | 3/1998 |
| DE | 10005294 A1 | 8/2001 |
| DE | 10238189 A1 | 2/2004 |
| DE | 202004011493 U1 | 9/2004 |
| DE | 20320702 U1 | 10/2005 |
| DE | 202005018884 U1 | 2/2006 |
| DE | 202007000556 U1 | 10/2007 |
| DE | 202007012420 U1 | 10/2007 |
| DE | 202010009385 U1 | 9/2010 |
| EP | 0409390 A2 | 1/1991 |
| EP | 0410622 A2 | 1/1991 |
| EP | 0415647 A2 | 3/1991 |
| EP | 0490644 A1 | 6/1992 |
| EP | 0541820 A1 | 5/1993 |
| EP | 0593927 A1 | 4/1994 |
| EP | 0720322 A2 | 7/1996 |
| EP | 0725468 A1 | 8/1996 |
| EP | 0828356 A2 | 3/1998 |
| EP | 0840153 A2 | 5/1998 |
| EP | 0928053 A2 | 7/1999 |
| EP | 1107031 A1 | 6/2001 |
| EP | 1120674 A1 | 8/2001 |
| EP | 1179745 A2 | 2/2002 |
| EP | 1203974 A2 | 5/2002 |
| EP | 1316829 A2 | 6/2003 |
| EP | 1944635 A2 | 7/2008 |
| EP | 1944886 A1 | 7/2008 |
| EP | 2060942 A2 | 5/2009 |
| EP | 2141527 A2 | 1/2010 |
| FR | 2123728 A5 | 9/1972 |
| FR | 2748576 A1 | 11/1997 |
| GB | 2254163 A | 9/1992 |
| JP | 59107317 A | 6/1984 |
| JP | 6227312 A | 8/1994 |
| JP | 11125722 A | 5/1999 |
| JP | 11231163 A | 8/1999 |
| JP | 2001116968 A | 4/2001 |
| JP | 2004061713 A | 2/2004 |
| WO | 8805925 A1 | 8/1988 |
| WO | 8905989 A1 | 6/1989 |
| WO | 9507484 A1 | 3/1995 |
| WO | 9630791 A1 | 10/1996 |
| WO | 9638752 A1 | 12/1996 |
| WO | 9722025 A1 | 6/1997 |
| WO | 9725642 A1 | 7/1997 |
| WO | 9736197 A1 | 10/1997 |
| WO | 0221186 A1 | 3/2002 |
| WO | 02099528 A1 | 12/2002 |
| WO | 03009527 A2 | 1/2003 |
| WO | 03093889 A1 | 11/2003 |
| WO | 2004086112 A1 | 10/2004 |
| WO | 2005020400 A1 | 3/2005 |
| WO | 2005050277 A2 | 6/2005 |
| WO | 2005088373 A1 | 9/2005 |
| WO | 2005091036 A1 | 9/2005 |
| WO | 2006050505 A1 | 5/2006 |
| WO | 2006127457 A1 | 11/2006 |
| WO | 2006135524 A3 | 12/2006 |
| WO | 2007050515 A1 | 5/2007 |
| WO | 2007089682 A2 | 8/2007 |
| WO | 2007129953 A1 | 11/2007 |
| WO | 2008033997 A1 | 3/2008 |
| WO | 2008048935 A2 | 4/2008 |
| WO | 2008125217 A1 | 10/2008 |
| WO | 2008137894 A1 | 11/2008 |
| WO | 2009029485 A1 | 3/2009 |

OTHER PUBLICATIONS

Non-final Office Action for U.S. Appl. No. 11/595,723 mailed Jun. 21, 2010, 9 pages.

Non-final Office Action for U.S. Appl. No. 11/595,723 mailed Jan. 5, 2010 9 pages.

Advisory Action for U.S. Appl. No. 11/595,723 mailed Nov. 24, 2009, 3 pages.

Final Office Action for U.S. Appl. No. 11/595,723 mailed Jul. 8, 2009, 13 pages.

Non-final Office Action for U.S. Appl. No. 11/595,723 mailed Sep. 25, 2008, 13 pages.

Final Office Action for U.S. Appl. No. 11/595,723 mailed Apr. 11, 2008, 12 pages.

Non-final Office Action for U.S. Appl. No. 11/595,723 mailed Jun. 7, 2007 18 pages.

Examiner's Answer to Appeal Brief for U.S. Appl. No. 11/975,440 mailed Oct. 22, 2010, 17 pages.

Final Office Action for U.S. Appl. No. 11/975,440 mailed Mar. 8, 2010, 10 pages.

Non-final Office Action for U.S. Appl. No. 11/975,440 mailed Oct. 28, 2009, 7 pages.

(56) References Cited

OTHER PUBLICATIONS

Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Monro et al., "Holey Fibers with random cladding distributions," Optic Letters, vol. 25, No. 4, Feb. 15, 2000, 3 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.
Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Final Office Action for U.S. Appl. No. 13/083,110 mailed Aug. 5, 2013, 13 pages.
Notice of Allowance for U.S. Appl. No. 12/417,250 mailed Nov. 9, 2011, 8 pages.
Decision on Appeal for U.S. Appl. No. 11/975,440 mailed Nov. 4, 2013, 10 pages.
Advisory Action for U.S. Appl. No. 13/083,110 mailed Nov. 12, 2013, 3 pages.
Advisory Action for U.S. Appl. No. 13/275,798 mailed Sep. 12, 2013, 2 pages.
Non-final Office Action for U.S. Appl. No. 12/417,250 mailed Jun. 23, 2011, 9 pages.
Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.
Advisory Action for U.S. Appl. No. 12/072,187 mailed Aug. 15, 2011, 2 pages.
Final Office Action for U.S. Appl. No. 12/072,187 mailed Jun. 13, 2011, 21 pages.
Non-final Office Action for U.S. Appl. No. 12/072,187 mailed Nov. 30, 2010, 17 pages.
Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
International Search Report for PCT/US2009/057140 mailed Nov. 9, 2009, 2 pages.
Examiner's Answer to Appeal Brief for U.S. Appl. No. 12/323,385 mailed Feb. 21, 2013, 11 pages.
Final Office Action for U.S. Appl. No. 12/625,341 mailed Feb. 12, 2013, 10 pages.
Advisory Action for U.S. Appl. No. 12/625,341 mailed Apr. 25, 2013, 6 pages.
Non-final Office Action for U.S. Appl. No. 12/625,341 mailed Oct. 16, 2012, 8 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Final Office Action for U.S. Appl. No. 12/751,860 mailed Nov. 5, 2012, 6 pages.
Non-final Office Action for U.S. Appl. No. 12/751,860 mailed Jul. 18, 2012, 8 pages.

(56) References Cited

OTHER PUBLICATIONS

Final Office Action for U.S. Appl. No. 13/275,798 mailed Jun. 27, 2013, 10 pages.
Non-final Office Action for U.S. Appl. No. 13/275,798 mailed Mar. 1, 2013, 8 pages.
Final Office Action for U.S. Appl. No. 13/177,233 mailed Mar. 29, 2013, 9 pages.
Advisory Action for U.S. Appl. No. 13/177,233 mailed Jul. 17, 2013, 3 pages.
Non-final Office Action for U.S. Appl. No. 13/177,233 mailed Dec. 17, 2012, 7 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Non-final Office Action for U.S. Appl. No. 10/804,958 mailed Aug. 30, 2013, 11 pages.
Notice of Allowance for U.S. Appl. No. 10/804,958 mailed May 24, 2013, 8 pages.
Decision on Appeal for U.S. Appl. No. 10/804,958 mailed Apr. 18, 2013, 9 pages.
Examiner's Answer to Appeal Brief for U.S. Appl. No. 10/804,958 mailed Apr. 29, 2010, 12 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Non-final Office Action for U.S. Appl. No. 13/479,846 mailed Sep. 13, 2013, 11 pages.
Non-final Office Action for U.S. Appl. No. 13/613,759 mailed Sep. 20, 2013, 10 pages.
Tanji et al., "Optical Fiber Cabling Technologies for Flexible Access Network," Optical Fiber Technology, Academic Press, London, US, vol. 14, No. 3, Jul. 1, 2008, 8 pages.
Non-final Office Action for U.S. Appl. No. 12/072,187 mailed Dec. 26, 2013, 25 pages.
Final Office Action for U.S. Appl. No. 10/804,958 mailed Mar. 11, 2014, 13 pages.
Notice of Allowance for U.S. Appl. No. 11/975,440 mailed Jan. 15, 2014, 7 pages.
Non-final Office Action for U.S. Appl. No. 13/087,765 mailed Sep. 18, 2013, 8 pages.
Final Office Action for U.S. Appl. No. 13/479,846 mailed Feb. 14, 2014, 11 pages.
Final Office Action for U.S. Appl. No. 13/613,759 mailed Jan. 27, 2014, 13 pages.
Non-final Office Action for U.S. Appl. No. 13/083,110 mailed Mar. 18, 2014, 14 pages.
International Search Report for PCT/US2011/030466 mailed Aug. 5, 2011, 4 pages.
Non-final Office Action for U.S. Appl. No. 13/094,572 mailed Jan. 18, 2013, 17 pages.
Final Office Action for U.S. Appl. No. 13/094,572 mailed Jul. 8, 2013, 13 pages.
Advisory Action for U.S. Appl. No. 13/094,572 mailed Oct. 7, 2013, 2 pages.
Non-final Office Action for U.S. Appl. No. 13/094,572 mailed Mar. 4, 2014, 14 pages.
Advisory Action for U.S. Appl. No. 13/613,759 mailed Apr. 7, 2014, 3 pages.
Non-final Office Action for U.S. Appl. No. 13/649,377 mailed Jan. 31, 2014, 5 pages.
International Search Report for PCT/US2011/030446 mailed Jul. 14, 2011, 3 pages.
International Search Report for PCT/US2011/030448 mailed Jul. 20, 2011, 5 pages.
Advisory Action for U.S. Appl. No. 10/804,958 mailed Jun. 26, 2014, 4 pages.
Notice of Allowance for U.S. Appl. No. 11/975,440 mailed Apr. 30, 2014, 8 pages.
Final Office Action for U.S. Appl. No. 12/072,187 mailed May 27, 2014, 27 pages.
Non-final Office Action for U.S. Appl. No. 13/089,692 mailed Jan. 13, 2014, 8 pages.
Non-final Office Action for U.S. Appl. No. 13/089,692 mailed May 5, 2014, 7 pages.
Final Office Action for U.S. Appl. No. 13/089,692 mailed Aug. 13, 2014, 8 pages.
Advisory Action for U.S. Appl. No. 13/089,692 mailed Oct. 22, 2014, 2 pages.
Notice of Allowance and Interview Summary for U.S. Appl. No. 13/094,572 mailed Aug. 7, 2014, 11 pages.
Examiner's Answer to the Appeal Brief for U.S. Appl. No. 13/275,798 mailed Aug. 26, 2014, 6 pages.
Advisory Action for U.S. Appl. No. 13/479,846 mailed May 8, 2014, 3 pages.
Non-final Office Action for U.S. Appl. No. 13/601,245 mailed Mar. 27, 2014, 8 pages.
Examiner's Answer to the Appeal Brief for U.S. Appl. No. 13/613,759 mailed Aug. 18, 2014, 6 pages.
Final Office Action for U.S. Appl. No. 13/649,377 mailed May 29, 2014, 8 pages.
Non-final Office Action for U.S. Appl. No. 14/093,636 mailed Oct. 10, 2014, 6 pages.
Non-final Office Action for U.S. Appl. No. 13/275,842 mailed Nov. 13, 2013, 7 pages.
Final Office Action for U.S. Appl. No. 13/275,842 mailed Aug. 28, 2014, 20 pages.
Examiner's Answer to the Appeal Brief for U.S. Appl. No. 12/072,187 mailed Dec. 19, 2014, 25 pages.
Final Office Action for U.S. Appl. No. 13/083,110 mailed Nov. 7, 2014, 20 pages.
Non-Final Office Action for U.S. Appl. No. 13/362,474 mailed Dec. 5, 2014, 8 pages.
Non-Final Office Action for U.S. Appl. No. 13/089,692 mailed Dec. 2, 2014, 7 pages.
Advisory Action for U.S. Appl. No. 13/275,842 mailed Nov. 20, 2014, 3 pages.
Non-Final Office Action for U.S. Appl. No. 13/648,811 mailed Oct. 24, 2014, 10 pages.

\* cited by examiner

INDEXABLE OPTICAL FIBER CONNECTORS AND OPTICAL FIBER CONNECTOR ARRAYS

BACKGROUND

1. Field

The present disclosure generally relates to optical fiber connectors and, more particularly, to indexable optical fiber connectors of optical fiber connector arrays for use in fiber hub distribution enclosures of a fiber optic communications network.

2. Technical Background

Fiber optic communications networks often use fiber distribution hubs containing optical splitters to connect entities to the network. Typically, splitters are maintained in a fiber distribution hub enclosure that may be accessed by field personnel to make connections to the network. Splitters may be configured with loose, connectorized pigtails that are individually connected and removed to and from the fiber optic communications network within the fiber distribution hub enclosure. Many loose, individual connectorized pigtails may become unmanageable within the fiber distribution hub enclosure, particularly when first installing an optical splitter. The loose connectorized pigtails may become tangled, misplaced, and/or damaged.

SUMMARY

Embodiments of the present disclosure are directed to optical fiber connectors, optical fiber connector arrays and optical fiber connector systems for use in fiber distribution hub enclosures of a fiber optic communications network. Individual optical fiber connectors comprise arraying features that allow for easy alignment of adjacent optical fiber connectors. The optical fiber connector array may then be positioned within a holder tray that is coupled to an installation panel within a fiber distribution hub enclosure.

According to one embodiment, an optical fiber connector includes a connector body comprising an optical coupling face and a connector housing that surrounds the connector body. The connector housing includes a first interconnecting surface having an indentation arraying feature, and a second interconnecting surface having a protrusion arraying feature. The first interconnecting surface and the second interconnecting surface are orthogonal to the optical coupling face. Similarly, the protrusion arraying feature is configured to mate with a corresponding indentation arraying feature of a second adjacent optical fiber connector by a non-locking engagement relationship.

According to yet another embodiment, an optical fiber connector array includes a plurality of optical fiber connectors surrounded by a removable retention mechanism. Each individual optical fiber connector of the plurality of optical fiber connectors includes a connector body having an optical coupling face, and a connector housing surrounding the connector body. The connector housing includes a first interconnecting surface having an indentation arraying feature, and a second interconnecting surface having a protrusion arraying feature. The first interconnecting surface and the second interconnecting surface are orthogonal to the optical coupling face. The indentation arraying feature is configured to mate with a corresponding protrusion arraying feature of a first adjacent interconnecting optical fiber connector by a non-locking engagement relationship. Similarly, the protrusion arraying feature is configured to mate with a corresponding indentation arraying feature of a second adjacent interconnecting optical fiber connector by a non-locking engagement relationship. The removable retention mechanism retains the plurality of optical fiber connectors in the optical fiber connector array such that that the indentation arraying feature of individual ones of the plurality of optical fiber connectors are mated to the protrusion arraying feature of individual ones of the plurality of optical fiber connectors.

According to yet another embodiment, an optical fiber connector system includes a plurality of optical fiber connectors arranged in an optical fiber connector array, a removable retention mechanism that surrounds the plurality of optical fiber connectors, and a holder tray for maintaining the plurality of optical fiber connectors. Each individual optical fiber connector includes a connector body having an optical coupling face, a connector housing that surrounds the connector body, and a fiber optic cable extending from a rear surface of the connector housing. The connector housing includes a first interconnecting surface having an indentation arraying feature, and a second interconnecting surface having a protrusion arraying feature. The first interconnecting surface and the second interconnecting surface are orthogonal to the optical coupling face. The indentation arraying feature is configured to mate with a corresponding protrusion arraying feature of a first adjacent interconnecting optical fiber connector by a non-locking engagement relationship. Similarly, the protrusion arraying feature is configured to mate with a corresponding indentation arraying feature of a second adjacent interconnecting optical fiber connector by a non-locking engagement relationship. The removable retention mechanism retains the plurality of optical fiber connectors in an optical fiber connector array such that the indentation arraying feature of individual ones of the plurality of optical fiber connectors are mated to the protrusion arraying feature of individual ones of the plurality of optical fiber connectors. The holder tray includes a support feature having a width and a length such that the holder tray accommodates the plurality of optical fiber connectors. The holder tray further includes a securing surface extending from the support feature, wherein the securing surface has a plurality of openings sized to accept a plurality of fiber optic cables associated with the plurality of optical fiber connectors such that the securing surface maintains the plurality of optical fiber connectors within the holder tray.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments are directed to optical fiber connectors, optical fiber connector arrays and optical fiber connector systems for use in fiber distribution hub enclosures of a fiber optic communications network. Individual optical fiber connectors comprise complementary arraying features that allow for easy alignment of adjacent optical fiber connectors. Aligned optical fiber connectors may then be retained by a removable retention mechanism to form an optical fiber connector array. The optical fiber connector array may be positioned within a holder tray that is coupled to an installation panel within a fiber distribution hub enclosure. The optical fiber connectors may be temporarily positioned within the holder tray prior to connection to the fiber optic communications network associated with the fiber distribution hub enclosure. Removal of the removable retention mechanism allows the optical fiber connectors of the optical fiber connector array to separate from one another for easy removal of individual optical fiber connectors from the holder tray by field personnel. Optical fiber connectors, optical fiber connector arrays, and optical fiber connector systems will be described in further detail herein with specific reference to the appended figures.

Figure 1:
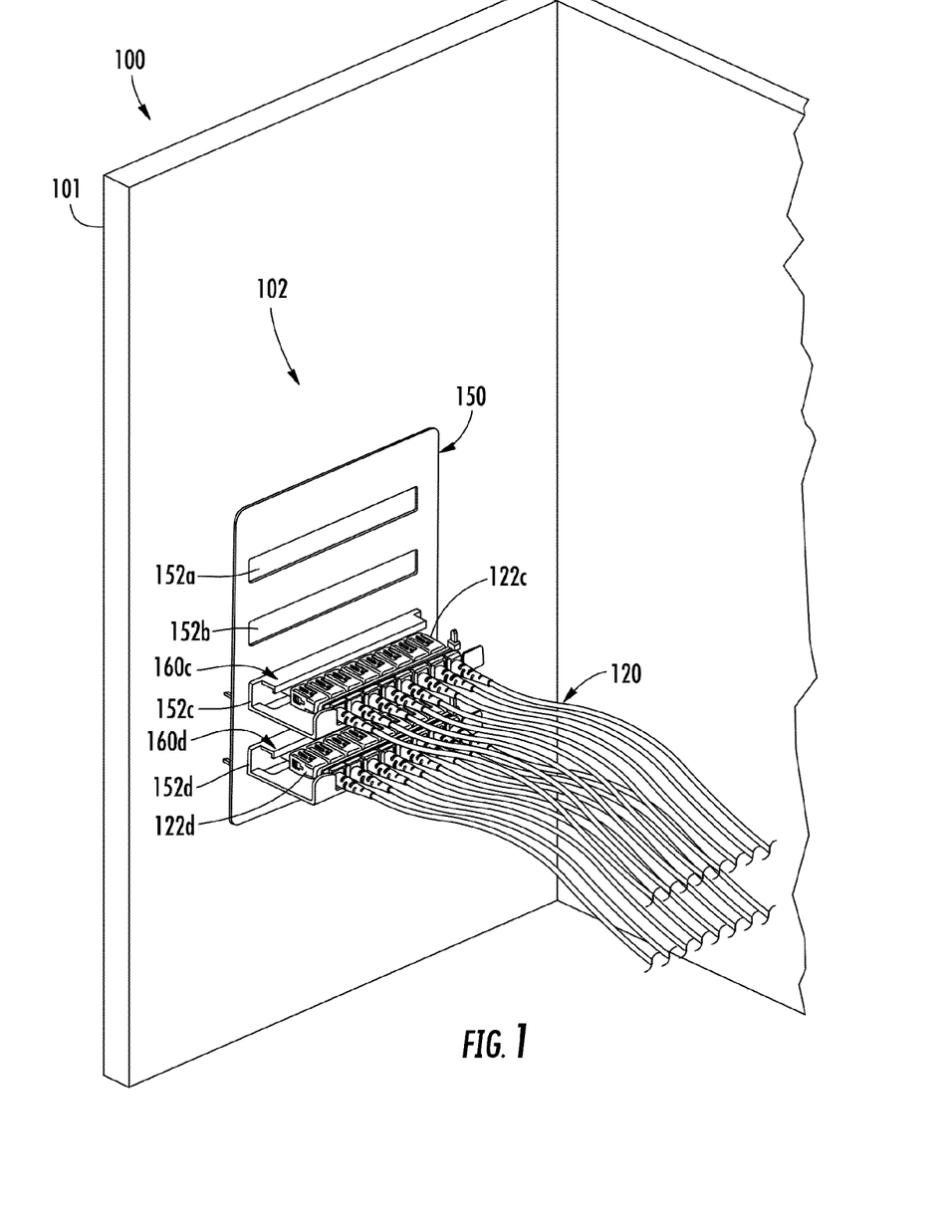
FIG. 1 schematically depicts an optical fiber connector system mounted to a door of a fiber distribution hub enclosure according to one or more embodiments shown and described herein.

FIG. 1A schematically depicts a partial view of a fiber distribution hub enclosure 100 for use in fiber communication networks. The fiber distribution hub enclosure 100 includes an optical fiber connector system 102 that may be used to temporarily place and organize a plurality of optical fiber connectors associated with connectorized pigtails of the fiber optic cables 120 of an optical splitter module (not shown). Exemplary optical fiber connector configurations may include, but are not limited to, a subscriber connector ("SC connector") and a local connector ("LC connector"). The optical fiber connector system 102 may be utilized by personnel to more easily manage or otherwise handle the many optical connectors that may be present within in the fiber distribution hub enclosure 100.

The optical fiber connector system 102 may be positioned on or within a hinged door 101 of a fiber distribution hub enclosure 100 such that it is accessible to field personnel. Generally, the illustrated optical fiber connector system 102 comprises an installation panel 150 having one or more openings 152a-152d and one or more holder trays 160c, 160d for receiving and maintaining an optical fiber connector array 122c, 122d. For example, field personnel may temporarily place one or more optical fiber connectors arrays 122c, 122d into one or more holder trays 160c, 160d prior to connecting the individual optical fibers to the fiber optic network associated with the fiber distribution hub enclosure 100 (e.g., in a fiber-to-the-premises (FTTP) network). As described in detail below, embodiments of the present disclosure may enable efficient indexing of individual optical fiber connectors of the optical fiber connector arrays at the factory, as well as increased manageability of the individual optical fiber connectors once inserted into the fiber distribution hub enclosure 100 by field personnel.

Figure 2A:
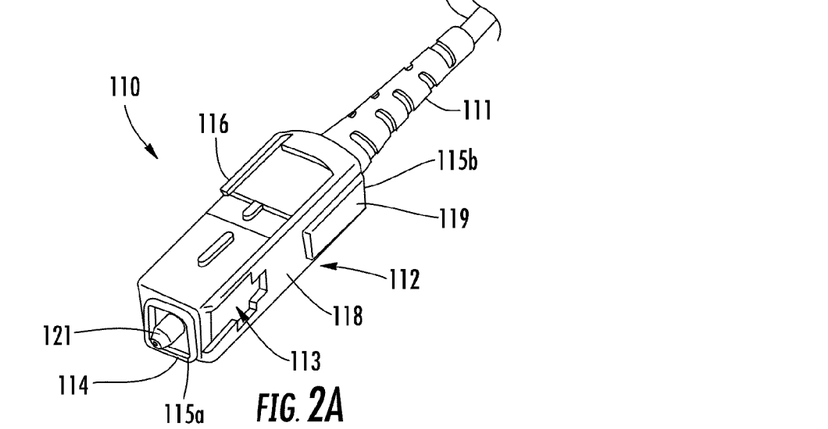
FIG. 2A schematically depicts a front perspective view of an optical fiber connector according to one or more embodiments shown and described herein.
Figure 2B:
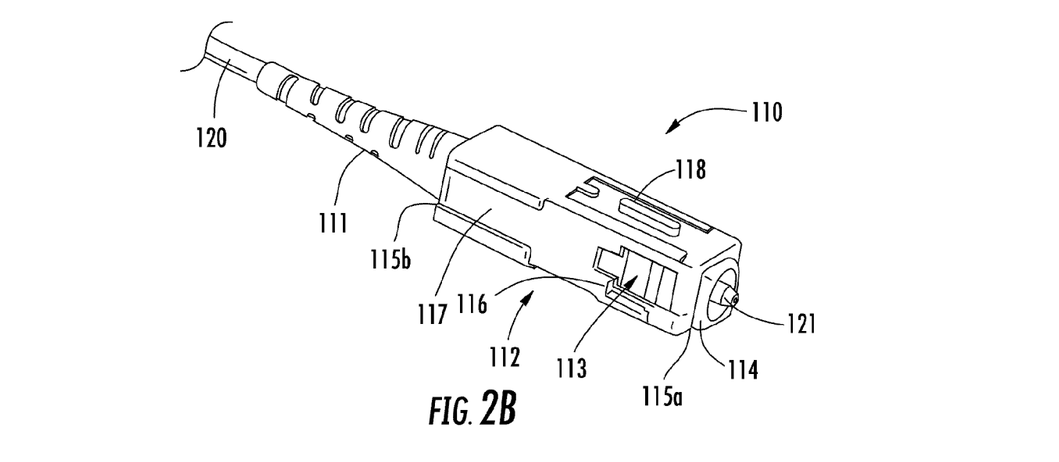
FIG. 2B schematically depicts another front perspective view of the optical fiber connector schematically depicted in FIG. 2A according to one or more embodiments shown and described herein.
Figure 2C:
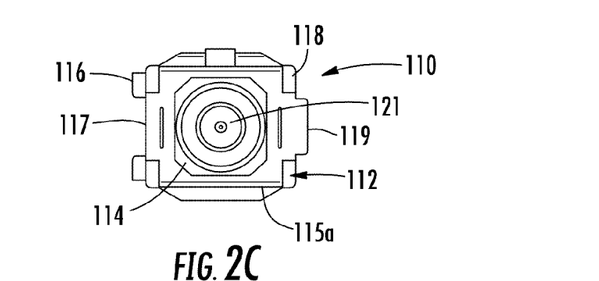
FIG. 2C schematically depicts a front view of the optical fiber connector schematically depicted in FIGS. 2A and 2B according to one or more embodiments shown and described herein.

Referring now to FIGS. 2A-2C, an individual optical fiber connector 110 according to one embodiment is schematically illustrated. Although the optical fiber connector 110 is depicted as an SC connector, embodiments are not limited thereto. Further, embodiments may also include duplex optical fiber connectors. The illustrated optical fiber connector 110 generally comprises a connector housing 112 that surrounds a connector body 114, a ferrule 121 extending from an optical coupling face 115a of the connector body 114, a strain relief structure 111 extending from a rear end 115b of the connector housing 112, and a fiber optic cable 120 within and extending from the strain relief structure 111. An optical fiber (not shown) is positioned within the fiber optic cable 120 and terminates at an end of the ferrule 121.

The connector housing 112 may be formed of non-electrically conductive materials, such as molded plastics, for example. The illustrated connector housing 112 has a first interconnecting surface 116 and a second interconnecting surface 118 for contacting with adjacent optical fiber connectors 110 to form an optical fiber connector array 122. The first interconnecting surface 116 is parallel to the second interconnecting surface 118. The first and second interconnecting surfaces 116, 118 may be substantially orthogonal with respect to the optical coupling face 115a, depending on the connector style. The first and second interconnecting surfaces 116, 118 comprise complementary arraying features such that a plurality of optical fiber connectors may be indexed or otherwise aligned together. The complementary arraying features may be configured as any arraying features wherein a first arraying feature may be aligned with and coupled to a complementary arraying feature. As described below, one of the complementary arraying features may be configured as a protrusion and the other as an indentation.

In the illustrated embodiment, the first interconnecting surface 116 of the connector housing 112 comprises an indentation arraying feature 117, and the second interconnecting surface 118 comprises a corresponding protrusion arraying feature 119. The connector housing 112 may also include one or more engagement features 113 for connecting the optical fiber connector 110 to corresponding, mated optical connectors, adaptors, or ports. The indentation arraying feature 117 and the protrusion arraying feature 119 may be positioned toward the rear end 115b of the connector housing 112 to allow for the optical fiber connector array 122 to be located in a holder tray.

As described in detail below, the indentation arraying feature 117 and the protrusion arraying feature 119 enable easy alignment and indexing of a plurality of optical fiber connectors 110 to form an optical fiber connector array. Although the indentation arraying feature 117 and the protrusion arraying feature 119 are illustrated as rectangular in shape, embodiments are not limited thereto. As an example and not a limitation, the indentation arraying feature 117 and the protrusion arraying feature 119 may be circular or elliptical in shape, or have other arbitrary profiles. Further, the connector housing 112 may include more than one indentation arraying feature 117 and more than one protrusion arraying feature 119. Additionally, each of the first interconnecting surface 116 and the second interconnecting surface 118 may include both an indentation arraying feature 117 and a protrusion arraying feature 119.

Figure 3A:
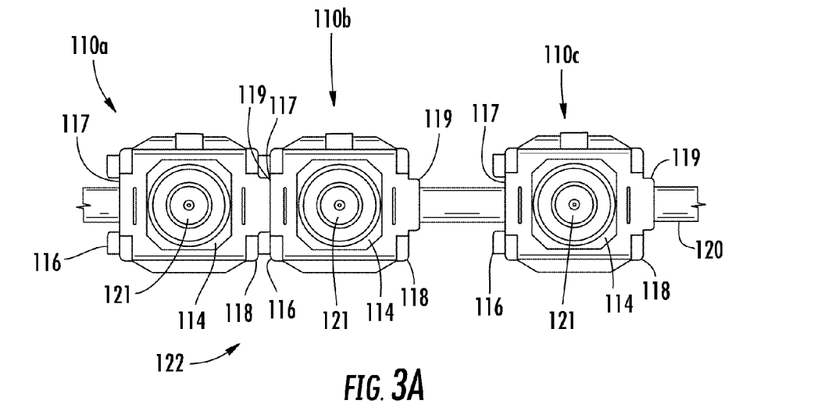
FIG. 3A schematically depicts a front view of a plurality of optical fiber connectors according to one or more embodiments shown and described herein.
Figure 3B:
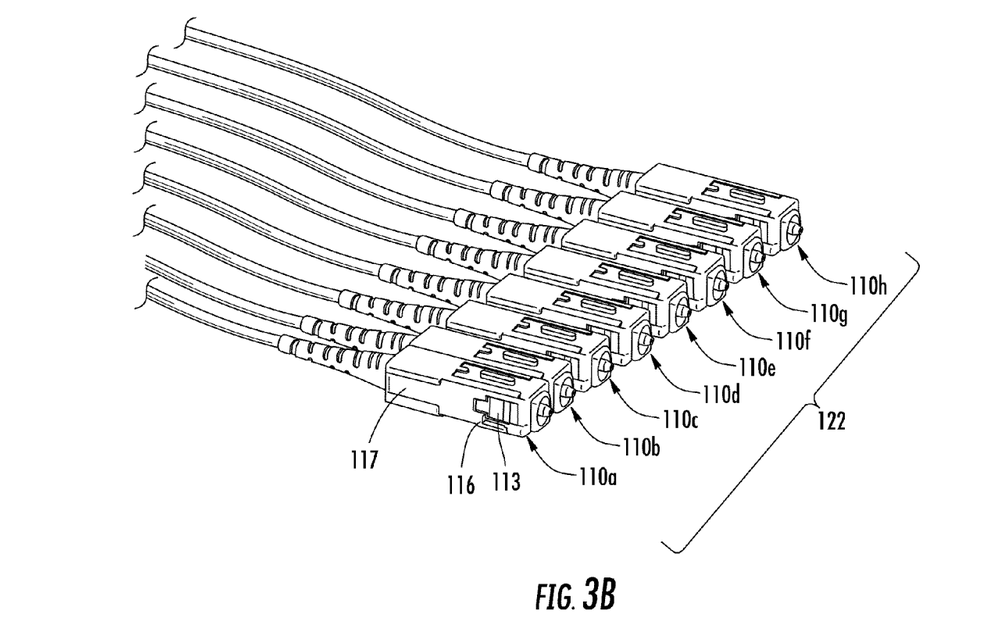
FIG. 3B schematically depicts a right, front perspective view of a plurality of optical fiber connectors according to one or more embodiments shown and described herein.
Figure 3C:
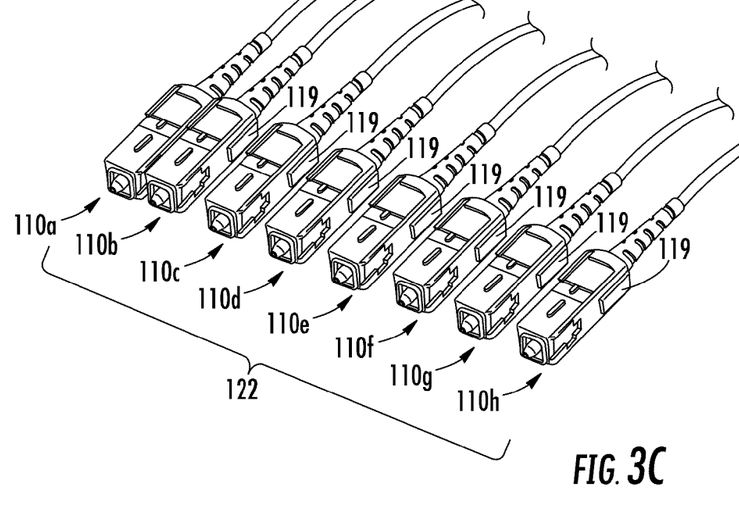
FIG. 3C schematically depicts a left, front perspective view of the plurality of optical fiber connectors schematically depicted in FIG. 3B according to one or more embodiments shown and described herein.

FIG. 3A schematically depicts a front view of a plurality of optical fiber connectors 110a-110c being indexed to form an optical fiber connector array via the indentation arraying features 117 and the protrusion arraying features 119. FIGS. 3B and 3C schematically depict two perspective views of a plurality of optical fiber connectors 110a-110h being indexed to form an optical fiber connector array.

As shown in FIG. 3A, the protrusion arraying features 119 are configured to be positioned in the indentation arraying features 117. The geometric configuration of the protrusion arraying feature 119 is such that the protrusion arraying feature 119 engages an indentation arraying feature 117 of an adjacent optical fiber connector by a slip-fit (i.e., the protrusion arraying feature 119 is configured to mate with a corresponding indentation arraying feature 117 of an adjacent optical fiber connector by a non-locking engagement relationship). For example, referring to FIG. 3A, the protrusion arraying feature 119 of a first optical fiber connector 110a engages the indentation arraying feature 117 of an adjacent, second optical fiber connector 110b such that an external retention force is required to maintain the first and second optical fiber connectors 110a, 110b in a mated relationship. Similarly, when a first interconnecting surface 116 of a third optical fiber connector 110c is brought into contact with a second interconnecting surface 118 of the second optical fiber connector 110b, the protrusion arraying feature 119 of the second optical fiber connector 110b will be positioned within the indentation arraying feature 117 of the third optical fiber connector 110c, thereby indexing the third optical fiber connector 110c with respect to the second optical fiber connector 110b.

In some embodiments, the protrusion arraying feature 119 and the indentation arraying feature 117 may have one or more chamfered surfaces to more easily position the protrusion arraying feature 119 into a corresponding indentation arraying feature 117. In other embodiments, the walls of the indentation arraying feature 117 and the protrusion arraying feature 119 are orthogonal with respect to the first and second interconnecting surfaces 116, 118, respectively.

It is also contemplated that each individual optical connector 100 of the plurality of optical connectors has only an indentation arraying feature 117 or a protrusion arraying feature 119. The housings of individual optical connectors may alternate between having only indentation arraying features 117 and having only protrusion arraying features 119. For example, the first interconnecting surface 116 and the second interconnecting surface 118 of a first optical connector may include one or more indentation arraying features 117, while second and third optical connectors that are adjacent to the first optical connector may include one or more protrusion arraying features 119.

FIGS. 3B and 3C schematically depict eight optical fiber connectors 110a-110h arranged to form an optical fiber connector array 122 when all of the optical fiber connectors 110-110h are properly aligned and indexed via the indentation arraying features 117 and the protrusion arraying features 119. It should be understood that more or fewer optical fiber connectors may be included in an optical fiber array.

Figure 4A:
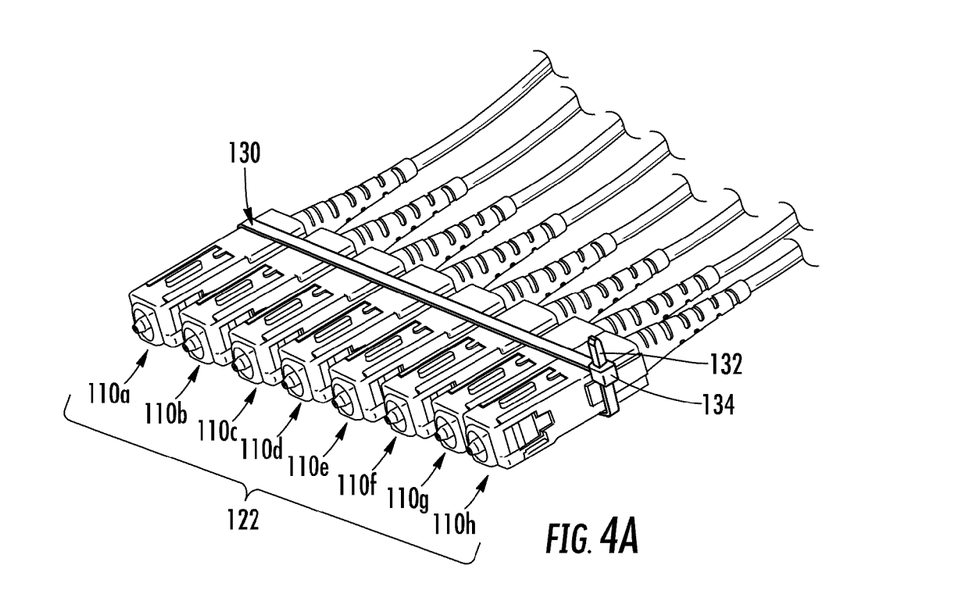
FIG. 4A schematically depicts a front perspective view of an optical fiber connector array retained by a removable retention mechanism according to one or more embodiments shown and described herein.

Because the indentation arraying feature 117 and the protrusion arraying feature mate by a slip-fit, the two corresponding arraying features do not provide retention between adjacent optical fiber connectors 110a-110h. FIG. 4A depicts the individual optical fiber connectors maintained in an optical fiber connector array 122 by a removable retention mechanism 130 that is wrapped around the indexed optical fiber connectors 110a-110h. The illustrated removable retention mechanism 130 is configured as a zip tie having an end 132 that is inserted into and maintained by a ratchet portion 134. The zip tie may be made of a flexible material, such as Nylon, for example.

Once the indentation arraying features 117 and the protrusion arraying features 119 are properly aligned, the zip tie removable retention mechanism 130 may be wrapped around the optical fiber connectors 110a-110h, and the end 132 positioned and pulled through ratchet portion 134 to provide a retention force on the optical fiber connectors 110a-110h such that they remain in the optical fiber connector array 122 for further processing and shipping.

Figure 4B:
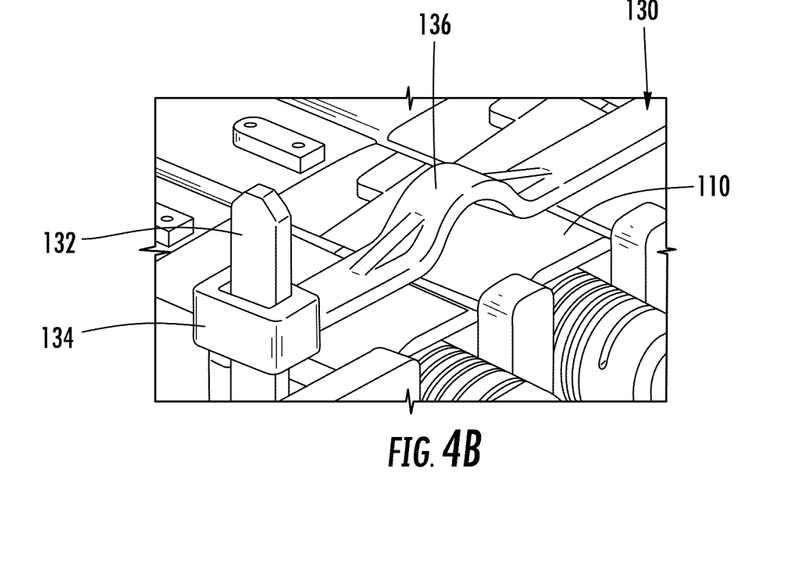
FIG. 4B schematically depicts a close-up view of a removable retention mechanism according to one or more embodiments shown and described herein.

FIG. 4B schematically depicts an embodiment wherein the zip tie removable retention mechanism 130 further comprises a cut portion 136 that extends above the optical fiber connector array 122. The cut portion 136 allows for a cutting tool to be inserted between the zip tie removable retention mechanism 130 and an individual optical fiber connector 110 for cutting and removal of the zip tie removable retention mechanism 130 after the optical fiber connector array 122 is located in the holder tray, as described below.

The removable retention mechanism 130 may be configured as components other than zip ties. Other configurations may include, but are not limited to, an adhesive band (e.g., tape) that is wrapped around the optical fiber connector array 122, as well as a clamping mechanism that is clamped over the optical fiber connector array 122, thereby retaining the individual optical fiber connectors 110a-110h in the optical fiber connector array 122.

Figure 5:
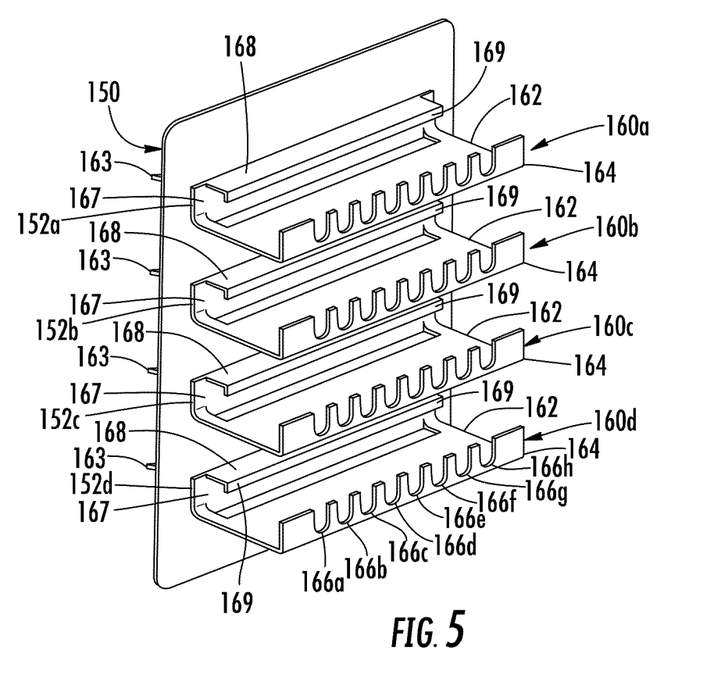
FIG. 5 schematically depicts a front perspective view of an installation panel populated with a plurality of holder trays according to one or more embodiments shown and described herein.

Referring now to FIG. 5, four empty holder trays 160a-160d are schematically illustrated as inserted into openings 152a-152d of an installation panel 150. The installation panel 150 may be installed in a fiber distribution hub enclosure 100 as illustrated in FIG. 1. Any number of openings 152a-152d may be provided to accept any number of holder trays 160a-160d.

The holder trays 160a-160d are sized and configured to accept and maintain optical fiber connector arrays 122. The holder trays 160a-160d may be made of any suitable material, such as Nylon, plastic, metal, etc. According to the illustrated embodiment, each holder tray 160a-160d comprises a plurality of engagement features 163 that engage a perimeter of the openings 152a-152d to secure the holder trays 160a-160d to the installation panel 150. The engagement features 163 may provide a removable snap-fit with the perimeter of the openings 152a-152d.

Each holder tray 160a-160d comprises a support surface 162 having a width to accommodate a maximum number of optical fiber connectors 110, and a length to accommodate a length of the individual optical fiber connectors 110. In the illustrated embodiment, the support surface 162 is generally orthogonal with respect to the installation panel 150. Extending from a front end of the support feature 162 is a securing surface 164 that is generally orthogonal with respect to the support feature 162. The illustrated securing surface 164 has a plurality of openings 166a-166h sized and configured to accept the fiber optic cables 120 (and/or strain relief structures 111; see FIGS. 1, 6 and 7).

Each holder tray 160a-160d also comprises a first surface 167 extending orthogonally from a rear end of the support feature 162, and a second surface 168 extending generally orthogonally from the first surface 167 and generally parallel to the support feature 162 in a direction toward the securing surface 164. The second surface 168 may cover the top of the optical coupling face 115a of the individual optical fiber connectors 110. In some embodiments, a lip 169 may extend from the second surface 168 toward the support feature 162 to engage a portion the individual optical fiber connectors 110 of the optical fiber connector array 122 while they are positioned in the holder tray 160a-160d. As an example and not a limitation, the lip 169 may contact dust caps that are coupled to the optical coupling faces 115a of the individual optical fiber connectors 110 to aid in removing the dust cap of an optical fiber connector 110 as it is removed from the holder tray 160a-160d.

Figure 6:
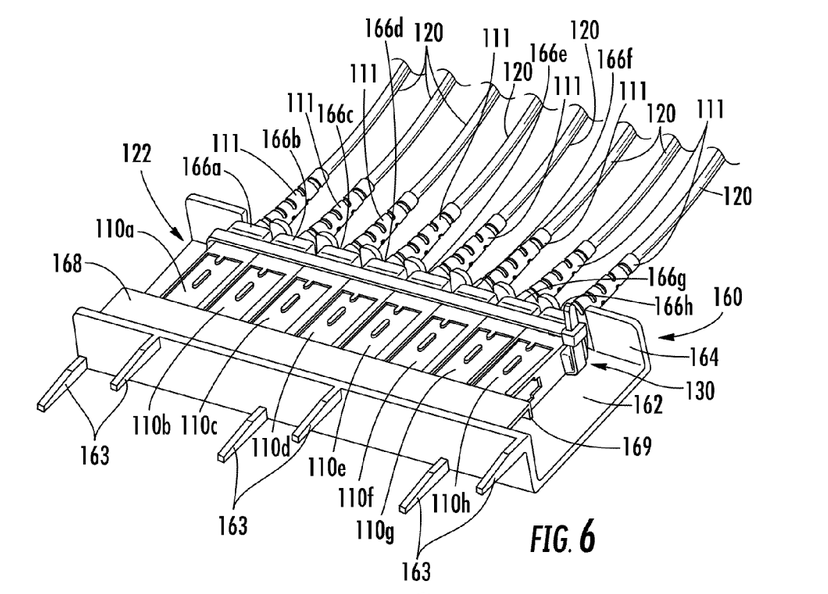
FIG. 6 schematically depicts a rear perspective view of an optical fiber connector array located within a holder tray according to one or more embodiments shown and described herein.

Referring now to FIG. 6, a holder tray 160 populated with an optical fiber connector array 122 comprising a plurality of individual optical fiber connectors 110a-110h is schematically illustrated. The optical fiber connector array 122 is positioned in the holder tray 160 such that the strain relief structure 111 of each individual optical fiber connector 110a-110h is positioned in the individual openings 166a-166h of the securing surface 164 of the holder tray 160. The openings 166a-166h of the securing surface 164 should be such that the strain relief structure 111 (or fiber optic cable 120) of the optical fiber connectors 110a-110h are positioned in the openings 166a-166h by a slip-fit for easy removal of the optical fiber connectors 110a-110h from the holder tray 160.

Figure 7:
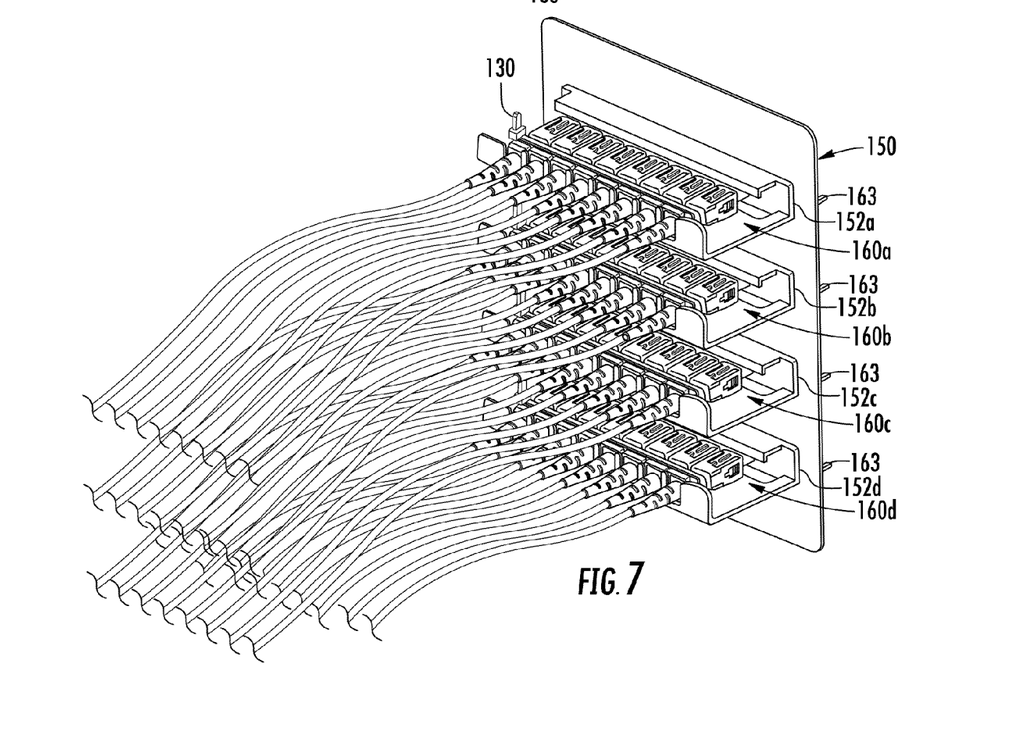
FIG. 7 schematically depicts a front perspective view of an optical fiber connector system according to one or more embodiments shown and described herein.

FIG. 7 schematically illustrates four populated holder trays 160a-160d positioned within openings 152a-152d of an installation panel 150 via engagement features 163. Each holder tray 160a-160d is depicted as maintaining an individual optical fiber connector array 122a-122d that is retained by a zip tie removable retention mechanism 130. The holder trays 160a-160d may be removed from the installation panel 150, if desired.

To remove individual optical fiber connectors 110 from the installation panel, field personnel may cut or otherwise remove the removable retention mechanism 130 from the optical fiber connector array 122a-122d while the optical fiber connector array 122a-122d is positioned in a holder tray 160a-160. Removal of the removable retention mechanism 130 allows the individual optical fiber connectors 110 of the optical fiber connector array 122a-122d to be separated within the holder tray 160a-160d because the indentation arraying features 117 and the protrusion arraying features 119 are mated in a non-locking relationship. The individual optical fiber connectors 110 are maintained within the holder tray 160a-160d after removal of the removable retention mechanism 130 by the openings 166a-166h of the securing surface 164. Field personnel may then remove individual optical fiber connectors 110 from the holder tray 160a-160d for connection within the fiber distribution hub enclosure 100 by pulling the desired optical fiber connector 110 from the holder tray 160a-160d (e.g., by pulling on the fiber optic cable 120 or the strain relief structure 111).

It should now be understood that embodiments are directed to optical fiber connectors comprising a connector housing having protrusion and indentation arraying features for alignment with adjacent optical fiber connectors in a non-locking relationship. The aligned or indexed optical fiber connectors may be retained in an optical fiber connector array by a removable retention mechanism placed around the indexed optical fiber connectors. The optical fiber connector array may then be positioned within a holder tray removably coupled to an installation panel within a fiber distribution hub enclosure. Upon removal of the removable retention mechanism, the individual optical fiber connectors of the optical fiber connector array disengage from one another such that they are loosely positioned within the holder tray for easy removal and further connection within the fiber distribution hub enclosure.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An optical fiber connector comprising:
    a connector body comprising an optical coupling face;
    a connector housing surrounding the connector body, the connector housing comprising a first interconnecting surface comprising a first arraying feature, and a second interconnecting surface comprising a second arraying feature, wherein:
        the first interconnecting surface and the second interconnecting surface are orthogonal to the optical coupling face;
        the first and second arraying features are configured to mate with corresponding arraying features of adjacent optical fiber connectors by a non-locking engagement relationship; and
        the first arraying feature and the second arraying feature are configured as an indentation arraying feature or a protrusion arraying feature.

2. The optical fiber connector of claim 1, wherein the optical fiber connector is an SC optical fiber connector.

3. The optical fiber connector of claim 1, wherein the indentation arraying feature and the protrusion arraying feature are rectangular in shape.

4. The optical fiber connector of claim 1, wherein the indentation arraying feature and the protrusion arraying feature are integral components of the connector housing.

5. The optical fiber connector of claim 1, wherein:
the connector housing comprises a rear end;
the first arraying feature is positioned within the first interconnecting surface closer to the rear end than to the optical coupling face; and
the second arraying feature is positioned within the second interconnecting surface closer to the rear end than to the optical coupling face.

6. An optical fiber connector comprising:
a connector body comprising an optical coupling face;
a connector housing surrounding the connector body, the connector housing comprising a first interconnecting surface comprising an indentation arraying feature, and a second interconnecting surface comprising a protrusion arraying feature, wherein:
the first interconnecting surface and the second interconnecting surface are orthogonal to the optical coupling face;
the indentation arraying feature is configured to mate with a corresponding protrusion arraying feature of a first adjacent interconnecting optical fiber connector by a non-locking engagement relationship; and
the protrusion arraying feature is configured to mate with a corresponding indentation arraying feature of a second adjacent optical fiber connector by a non-locking engagement relationship.

7. The optical fiber connector of claim 6, wherein the optical fiber connector is an SC optical fiber connector.

8. The optical fiber connector of claim 6, wherein the indentation arraying feature and the protrusion arraying feature are rectangular in shape.

9. The optical fiber connector of claim 6, wherein the indentation arraying feature and the protrusion arraying feature are integral components of the connector housing.

10. The optical fiber connector of claim 9, wherein the indentation arraying feature and the protrusion arraying feature are formed by a molding process.

11. The optical fiber connector of claim 6, wherein:
the connector housing comprises a rear end;
the indentation arraying feature is positioned within the first interconnecting surface closer to the rear end than to the optical coupling face; and
the protrusion arraying feature is positioned within the second interconnecting surface closer to the rear end than to the optical coupling face.

12. The optical fiber connector of claim 6, wherein the indentation arraying feature and the protrusion arraying feature each comprise a chamfer surface.

13. An optical fiber connector array comprising:
a plurality of optical fiber connectors, each individual optical fiber connector of the plurality of optical fiber connectors comprising:
a connector body comprising an optical coupling face;
a connector housing surrounding the connector body, the connector housing comprising a first interconnecting surface comprising an indentation arraying feature, and a second interconnecting surface comprising a protrusion arraying feature, wherein:
the first interconnecting surface and the second interconnecting surface are orthogonal to the optical coupling face;
the indentation arraying feature is configured to mate with a corresponding protrusion arraying feature of a first adjacent interconnecting optical fiber connector by a non-locking engagement relationship; and
the protrusion arraying feature is configured to mate with a corresponding indentation arraying feature of a second adjacent interconnecting optical fiber connector by a non-locking engagement relationship; and
a removable retention mechanism surrounding the plurality of optical fiber connectors, wherein the removable retention mechanism retains the plurality of optical fiber connectors in the optical fiber connector array such that that the indentation arraying feature of individual ones of the plurality of optical fiber connectors are mated to the protrusion arraying feature of individual ones of the plurality of optical fiber connectors.

14. The optical fiber connector array of claim 13, wherein the removable retention mechanism comprises a zip tie that is positioned around the plurality of optical fiber connectors.

15. The optical fiber connector array of claim 14, wherein the zip tie comprises a cut portion that is offset from one or more individual optical fiber connectors.

16. The optical fiber connector array of claim 13, wherein the removable retention mechanism comprises an adhesive band.

17. The optical fiber connector array of claim 13, wherein each individual optical fiber connector is an SC optical fiber connector.

18. The optical fiber connector array of claim 13, wherein:
the indentation arraying feature is positioned within the first interconnecting surface closer to a rear end of the connector housing than the optical coupling face of the connector body; and
the protrusion arraying feature is positioned within the second interconnecting surface closer to the rear end of the connector housing than the optical coupling face of the connector body.

19. The optical fiber connector array of claim 13, wherein the indentation arraying feature and the protrusion arraying feature each comprise a chamfer surface.

20. An optical fiber connector system comprising:
a plurality of optical fiber connectors, each individual optical fiber connector of the plurality of optical fiber connectors comprising:
a connector body comprising an optical coupling face;
a connector housing surrounding the connector body, the connector housing comprising a first interconnecting surface comprising an indentation arraying feature, and a second interconnecting surface comprising a protrusion arraying feature, wherein:
the first interconnecting surface and the second interconnecting surface are orthogonal to the optical coupling face;
the indentation arraying feature is configured to mate with a corresponding protrusion arraying feature of a first adjacent interconnecting optical fiber connector by a non-locking engagement relationship;
the protrusion arraying feature is configured to mate with a corresponding indentation arraying feature of a second adjacent interconnecting optical fiber connector by a non-locking engagement relationship; and
a fiber optic cable extending from a rear surface of the connector housing;
a removable retention mechanism surrounding the plurality of optical fiber connectors, wherein the removable retention mechanism retains the plurality of optical fiber connectors in an optical fiber connector array such that that the indentation arraying feature of individual ones of the plurality of optical fiber connectors are mated to the protrusion arraying feature of individual ones of the plurality of optical fiber connectors; and a holder tray comprising:

a support feature having a width and a length such that the holder tray accommodates the plurality of optical fiber connectors; and a securing surface extending from the support feature, the securing surface comprising a plurality of openings sized to accept a plurality of fiber optic cables associated with the plurality of optical fiber connectors, wherein the securing surface maintains the plurality of optical fiber connectors within the holder tray.

21. The optical fiber connector system of claim 20, wherein removal of the removable retention mechanism causes the plurality of optical fiber connectors to separate for individual removal from the holder tray.

22. The optical fiber connector system of claim 20, wherein the securing surface is substantially orthogonal with respect to the support feature.

23. The optical fiber connector system of claim 20, wherein the holder tray further comprises:

a first surface extending from an end of the support feature that is opposite from the securing surface;

a second surface extending from the first surface along a direction that is toward the securing surface; and a lip extending toward the plurality of optical fiber connectors such that the lip engages at least a portion of an individual optical fiber.

24. The optical fiber connector system of claim 21, further comprising an installation panel, wherein the holder tray is configured to be attached to the installation panel.

25. The optical fiber connector system of claim 23, wherein the installation panel comprises an opening, and the holder tray comprises a plurality of engagement features that engage portions of the installation panel that define the opening.

* * * * *